US008807436B2

(12) United States Patent
Watanabe et al.

(10) Patent No.: US 8,807,436 B2
(45) Date of Patent: Aug. 19, 2014

(54) CARD PROCESSING UNIT AND CARD ISSUING DEVICE

(75) Inventors: Takeki Watanabe, Nagano (JP); Keiji Ohta, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 345 days.

(21) Appl. No.: 13/002,796

(22) PCT Filed: Jul. 8, 2009

(86) PCT No.: PCT/JP2009/003193
§ 371 (c)(1),
(2), (4) Date: Feb. 15, 2011

(87) PCT Pub. No.: WO2010/004748
PCT Pub. Date: Jan. 14, 2010

(65) Prior Publication Data
US 2011/0127330 A1    Jun. 2, 2011

(30) Foreign Application Priority Data

Jul. 9, 2008   (JP) ................................ 2008-178593
Aug. 5, 2008   (JP) ................................ 2008-201366

(51) Int. Cl.
*G06K 13/00*   (2006.01)
*G06K 13/08*   (2006.01)
*G06K 7/10*    (2006.01)

(52) U.S. Cl.
CPC .......... *G06K 13/08* (2013.01); *G06K 7/10316* (2013.01)
USPC ........... 235/475; 235/449; 235/451; 235/454; 271/272; 271/274

(58) Field of Classification Search
USPC ........................................ 235/475
See application file for complete search history.

(56) References Cited

U.S. PATENT DOCUMENTS 5,917,177 A  *  6/1999  Owa et al. ..................... 235/486
2005/0012264 A1 *  1/2005  Morrison et al. ............. 271/274

FOREIGN PATENT DOCUMENTS

JP          62-254284          11/1987
JP          07-121979          5/1995
(Continued)

OTHER PUBLICATIONS

English Translation of Inoue JP 2004-013633.*
(Continued)

*Primary Examiner* — Christopher Stanford
(74) *Attorney, Agent, or Firm* — Frommer Lawrence & Haug LLP (57) ABSTRACT

A card processing unit that enables increasing a degree of freedom of a location of a communication antenna between pad rollers and simplifying a structure of the card processing unit itself. Specifically, a card processing unit equipped with a communication antenna for communicating with a non-contact IC card. The processing unit includes: two transfer rollers for transferring the non-contact IC card through contacting a surface of the non-contact IC card; pad rollers so placed as to face and bias themselves to the transfer rollers; fixed shafts protruding at both sides of each of the pad rollers in the axial direction for supporting the pad roller so as to be rotatable; and coil springs for biasing the fixed shafts at both the sides of the pad roller 16 in the axial direction so as to press the pad roller toward a corresponding one of the transfer rollers.

16 Claims, 5 Drawing Sheets

(56) References Cited

FOREIGN PATENT DOCUMENTS

| JP | 09-171680 | 1/1997 | | |
|---|---|---|---|---|
| JP | 2004-13633 | 1/2004 | | |
| JP | 2005089054 A | * | 4/2005 | ............... B65H 5/06 |

OTHER PUBLICATIONS

English Translation of Watabe JP 2005-089054.*

* cited by examiner

CARD PROCESSING UNIT AND CARD ISSUING DEVICE

The present application claims priority from PCT Patent Application No. PCT/JP2009/003193 filed on Jul. 8, 2009, which claims priority from Japanese Patent Application Nos. JP 2008-178593 filed on Jul. 9, 2008, and JP 2008-201366 filed on Aug. 5, 2008, the disclosure of which is incorporated herein by reference in its entirety.

BACKGROUND OF THE INVENTION

1. Field of the Invention

The present invention relates to a card processing unit including a communication antenna for communication with a non-contact IC card, and a card issuing device equipped with such a card processing unit.

2. Description of Related Art

Conventionally known is a non-contact IC card processing device including a communication antenna for communication with a non-contact IC card (For example, refer to Japanese Unexamined Patent Application Publication No. 2004-13633 ("JP 2004-13633"). A non-contact IC card processing device described in JP 2004-13633 includes two transfer rollers for transferring a non-contact IC card, and two pressing rollers that are so placed as to face and bias themselves to the transfer rollers.

In the non-contact IC card processing device, the transfer rollers are placed at a lower side of a transfer path for the non-contact IC card, while the pressing rollers are placed at a higher side of the transfer path. Furthermore, in the non-contact IC card processing device, the pressing rollers are so supported as to be rotatable at a lower side of a connecting member formed as a rectangular slot with an opening toward a side of the transfer path, while the connecting member is biased toward a lower direction by using a coil spring.

Thus, in the non-contact IC card processing device described in JP 2004-13633, the connecting member for supporting the two pressing rollers placed at the higher side of the transfer path is so formed as to be a rectangular slot. Therefore, between the two pressing rollers at the higher side of the transfer path, there can exist a space for placing a communication antenna.

Furthermore, the non-contact IC card processing device described in JP 2004-13633 is composed of a read/write processing section to carry out a recording process and a reproducing process for the non-contact IC card as well as a printing section to carry out a printing process for the non-contact IC card, for which data processing is carried out in the read/write processing section, in an integrated manner.

Placed in the read/write processing section described in JP 2004-13633 are the communication antenna, the transfer rollers for transferring the non-contact IC card toward the communication antenna, and the pressing rollers that are so placed as to face and bias themselves to the transfer rollers.

SUMMARY OF THE INVENTION

Unfortunately, the non-contact IC card processing device described in JP 2004-13633 needs to have the connecting member for connecting the two pressing rollers so that a structure of the device becomes complicated. Moreover, since the connecting member is located between the two pressing rollers, a degree of freedom of a location of the communication antenna is low.

Then, it is a first subject of the present invention to provide a card processing unit that enables increasing a degree of freedom of a location of a communication antenna between pad rollers and simplifying a structure of the card processing unit itself, and also provide a card issuing device equipped with such a card processing unit.

Furthermore, according to a popularization of non-contact IC cards in recent years, diversified are card processing devices provided with a function for processing data of a non-contact IC card. In the case of the non-contact IC card processing device described in JP 2004-13633, unfortunately the read/write processing section provided with the function for processing data of a non-contact IC card is integrated with the printing section. Therefore, when the read/write processing section described in JP 2004-13633 is used in another card processing device, the read/write processing section needs to have a design change. In other words, the read/write processing section described in JP 2004-13633 does not have a general versatility. When the read/write processing section is used in another card processing device, problems are that the design change takes time and eventually a design cost becomes increased.

Then, it is a second subject of the present invention to provide a card processing unit having the function for processing data of a non-contact IC card, while the card processing unit being able to enhance the general versatility.

To bring a solution for the first subject described above, a card processing unit, equipped with a communication antenna for communicating with a non-contact IC card, according to the present invention includes: two transfer rollers for transferring the non-contact IC card while contacting a surface of the non-contact IC card; pad rollers placed so as to face and bias themselves to the transfer rollers; fixed shafts protruding at both sides in an axial direction of the pad rollers for supporting the pad rollers so as to be rotatable; and coil springs for biasing the fixed shafts in a direction for pressing the pad rollers toward the transfer rollers at both the sides in the axial direction of the pad rollers.

In the present invention, the coil springs are, for example, compression coil springs.

In the card processing unit according to the present invention, the pad rollers placed so as to face the transfer rollers are so supported by the fixed shafts as to be rotatable, while the fixed shafts are biased by the coil springs in a direction to press the pad rollers toward the transfer rollers. Therefore, the card processing unit can be constructed in such a way that no member for supporting and/or biasing the pad rollers exists between the two pad rollers. For example, if the coil springs are compression coil springs, no member for supporting and/ or biasing the pad rollers exists between the pad rollers. Accordingly, a wide space can be secured between the two pad rollers so that this arrangement enables increasing a degree of freedom of a location of a placement area for a communication antenna between the two pad rollers. Furthermore, the pad rollers can be supported and biased by a simple mechanism including the fixed shafts and the coil springs, and accordingly the structure of the card processing unit can be simplified.

In the present invention, preferably formed in each of the fixed shafts are flat contacting planes with which ends of the compression coil springs contact. A structure of this arrangement enables one end of each of the compression coil springs to contact with the fixed shaft for sure so that the pad roller can appropriately be biased toward the transfer roller.

In the present invention, it is preferable that the card processing unit includes a first guide block and a second guide block that are assembled in a direction of thickness of the non-contact IC card so as to form a transfer path for transferring the non-contact IC card; the two transfer rollers are so supported as to be rotatable by one of the first guide block and the second guide block, while being so placed as to have a distance between their centers that is shorter than the length of the non-contact IC card in a transfer direction of the non-contact IC card; and the fixed shafts are supported by the other of the first guide block and the second guide block. When being constructed in this way, the card processing unit can be handled as one module provided with a function for transferring the card. Accordingly, this arrangement enables a use of the card processing unit in combination with various units for card processing provided with other functions, and also leads to improvement of general versatility of the card processing unit.

In the present invention, it is preferable that a part of each of the transfer rollers protrudes in the transfer direction out of end surfaces of the first guide block and the second guide block in the transfer direction. Namely, it is preferable that a center of each of the transfer rollers is located in the vicinity of the end surfaces of the first guide block and the second guide block in the transfer direction. When being constructed in this way, the card processing unit having another unit provided with any other function located before and/or after the card processing unit itself in the transfer direction can send and receive the non-contact IC card smoothly to/from the unit.

In the present invention, for example, the transfer rollers are placed at an upper side position over the transfer path while the pad rollers are placed at a lower side position under the transfer path. In this case, a structure of the upper side over the transfer path can be simplified.

To bring a solution for the first subject described above, a card processing unit, equipped with a communication antenna for communicating with a non-contact IC card, according to the present invention includes: two transfer rollers for transferring the non-contact IC card while contacting a surface of the non-contact IC card; pad rollers placed so as to face and bias themselves to the transfer rollers; turning shafts protruding at both sides in an axial direction of the pad rollers and turning together with the pad rollers; and coil springs for biasing the turning shafts in a direction for pressing the pad rollers toward the transfer rollers at both the sides in the axial direction of the pad rollers.

In the card processing unit according to the present invention, the pad rollers placed so as to face the transfer rollers are supported by the turning shafts, while the turning shafts are biased by the coil springs in a direction to press the pad rollers toward the transfer rollers. Therefore, the card processing unit can be constructed in such a way that no member for supporting and/or biasing the pad rollers exists between the two pad rollers. Accordingly, a wide space can be secured between the two pad rollers so that this arrangement enables increasing a degree of freedom of a location of a placement area for a communication antenna between the two pad rollers. Furthermore, the pad rollers can be supported and biased by a simple mechanism including the turning shafts and the coil springs, and accordingly the structure of the card processing unit can be simplified.

The card processing unit according to the present invention can be used for a card issuing device including a card storage section for storing the non-contact IC card; and a card dispensing mechanism for dispensing the non-contact IC card, stored in the card storage section, to the card processing unit. The card issuing device constructed as described above enables increasing a degree of freedom of a location of a placement area for a communication antenna between the two pad rollers. Furthermore, since the structure of the card processing unit can be simplified, a structure of the card issuing device itself can be simplified.

To bring a solution for the second subject described above, a card processing unit according to the present invention includes: a communication antenna for communicating with a non-contact IC card; two transfer rollers for transferring the non-contact IC card while contacting a surface of the non-contact IC card; and a frame having a transfer path through which the non-contact IC card is transferred; wherein each of the two transfer rollers is so supported as to be rotatable at both ends of the frame in the transfer direction of the non-contact IC card, and the two transfer rollers are so placed as to have a distance between their centers that is shorter than the length of the non-contact IC card in the transfer direction.

In the card processing unit according to the present invention, the two transfer rollers are individually supported at both the ends of the frame in the transfer direction of the non-contact IC card. Therefore, the non-contact IC card can be loaded into and unloaded from the card processing unit. Moreover, in the present invention, the two transfer rollers are so placed as to have a distance between their centers that is shorter than the length of the non-contact IC card in the transfer direction. Accordingly, the non-contact IC can be transferred in the card processing unit.

Therefore, according to the present invention, the card processing unit can be handled as one module provided with a data processing function as well as a transferring function for the non-contact IC card. As a result, this arrangement enables a use of the card processing unit in combination with various units for card processing provided with other functions, or a use of the card processing unit alone without any other unit, and it leads to improvement of general versatility of the card processing unit.

In the present invention, it is preferable that the card processing unit includes two pad rollers placed so as to face and bias themselves to the transfer rollers; each of the two pad rollers is so supported as to be rotatable at both ends of the frame in the transfer direction; and the communication antenna is placed at least one of an area between the two transfer rollers and another area between the two pad rollers. When being constructed in this way, the card processing unit can be downsized in the transfer direction and the thickness-wise direction of the non-contact IC card so as to make an installation space for the card processing unit small. Accordingly, this arrangement enables a use of the card processing unit in combination with further various units for card processing.

In the present invention, it is preferable that a part of each of the transfer rollers protrudes in the transfer direction out of end surfaces of the frame in the transfer direction. Furthermore, it is also preferable that formed at end surfaces of the frame in the transfer direction are placement opening sections in each of which a part of the transfer rollers is placed; and each of the placement opening sections leads to the transfer path in the thickness-wise direction of the non-contact IC card. In other words, it is preferable that a center of each of the transfer rollers is located in the vicinity of the end surface of the frame in the transfer direction. When being constructed in this way, the card processing unit having another unit provided with any other function located before and/or after the card processing unit itself in the transfer direction can send and receive the non-contact IC card smoothly to/from the unit.

In the present invention, it is preferable that the card processing unit includes two pad rollers placed so as to face and bias themselves to the transfer rollers; the frame includes a first guide block and a second guide block that are assembled together in the thickness-wise direction of the non-contact IC card so as to form the transfer path; and the transfer rollers are so supported as to be rotatable by one of the first guide block and the second guide block, while the pad rollers are so supported as to be rotatable by the other of the first guide block and the second guide block. When being constructed in this way, the card processing unit can be built up by assembling together one of the first guide block and the second guide block, in which the transfer rollers are installed, and the other of the first guide block and the second guide block, in which the pad rollers are installed, in the thickness-wise direction of the non-contact IC card. As a result, the card processing unit can be assembled easily.

In the present invention, it is preferable that the card processing unit includes a drive power input mechanism into which input is drive power to be transmitted to the two transfer rollers from an external driving source. When being constructed in this way, the card processing unit does not need to have any drive power source for the transfer rollers. Accordingly, this arrangement enables simplifying the structure of the card processing unit.

In the present invention, it is preferable that the card processing unit includes at least two card detection mechanisms located at intervals shorter than the length of the non-contact IC card in the transfer direction. According to this construction, the card detection mechanisms can detect both end parts of the non-contact IC card in the transfer direction. Therefore, according to detection results by using the card detection mechanisms, various controls can be carried out for any other card processing units combined together with the card processing unit as well as the card processing unit itself.

In the present invention, it is preferable that the card processing unit includes: pad rollers placed so as to face and bias themselves to the transfer rollers; fixed shafts protruding at both sides in an axial direction of the pad rollers for supporting the pad rollers so as to be rotatable; and coil springs for biasing the fixed shafts in a direction for pressing the pad rollers toward the transfer rollers at both the sides in the axial direction of the pad rollers. When the card processing unit is constructed in this way, no member for supporting and/or biasing the pad rollers exists between the two pad rollers. Accordingly, a wide space can be secured between the two pad rollers so that this arrangement enables increasing a degree of freedom of a location of a placement area for a communication antenna between the two pad rollers.

As described above, in a card processing unit and a card issuing device according to the present invention, a degree of freedom of a location of a communication antenna between pad rollers can be increased, and furthermore a structure of the card processing unit and the card issuing device themselves can be simplified.

Moreover, the present invention enables enhancement of a general versatility of the card processing unit.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

General Structure of Card Issuing Device

Figure 1:
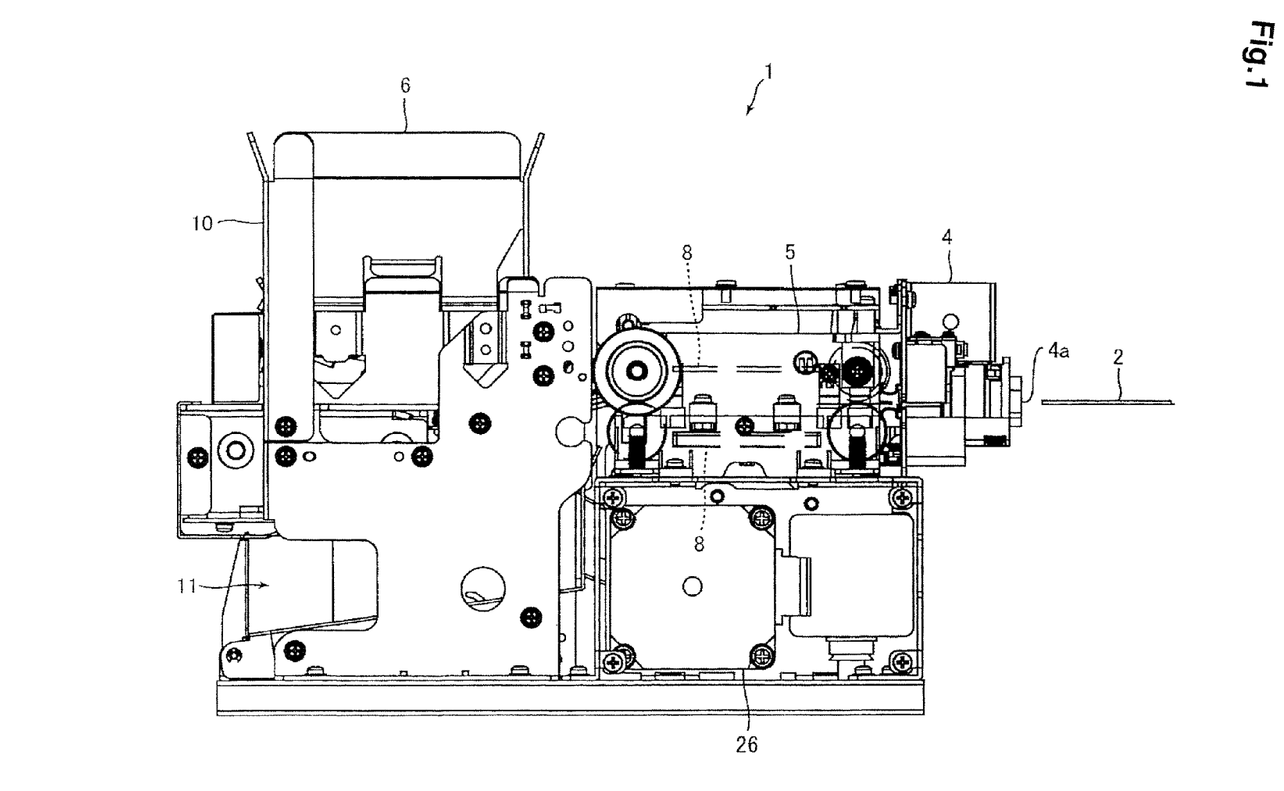
FIG. 1 is a side view drawing for explaining a general structure of a card issuing device according to an embodiment of the present invention.

FIG. 1 is a side view drawing for explaining a general structure of a card issuing device 1 according to an embodiment of the present invention.

The card issuing device 1 of the present embodiment is provided with a function for issuing a card 2 stored internally, and a function for collecting a card 2 that is unwanted, used, or failed (hereinafter called the card 2 unwanted). As shown in FIG. 1, the card issuing device 1 includes a card loading/unloading unit 4 through which the card 2 is loaded and unloaded, a card processing unit 5 for reproducing information recorded in the card 2 and/or recording information into the card 2, and a card issuing/collecting unit 6 for issuing the card 2 stored and collecting the card 2 unwanted. In the present embodiment, the card loading/unloading unit 4, the card processing unit 5, and the card issuing/collecting unit 6 are laid out back to back in this order from a right side in FIG. 1.

The card 2 is, for example, a rectangular PVC card with a thickness of 0.7 to 0.8 mm. A communication antenna is embedded in the card 2. In other words, the card 2 in the present embodiment is a non-contact IC card. Incidentally, on a surface of the card 2, there may be formed a magnetic stripe in which magnetic information is recorded, and a print area where characters are printed through thermal printing. Moreover, an IC chip may be fixedly placed there. Furthermore, as far as a communication antenna can be embedded, the card 2 may be a PET (polyethylene terephthalate) card with a thickness of 0.18 to 0.36 mm, a paper card with a certain thickness, or the like.

Formed in the card loading/unloading unit 4 is a card loading/unloading port 4a for loading and unloading the card 2. Furthermore, internally placed in the card loading/unloading unit 4 are, for example, a sensor for detecting the card 2 inserted, a shutter component for opening/closing the card loading/unloading port, and so on.

The card processing unit 5 includes a communication antenna 8 to be used for reproducing information recorded in the card 2 and recording information into the card 2 through communication with an antenna embedded in the card 2. A structure of the card processing unit 5 is described later in detail.

The card issuing/collecting unit 6 is equipped with a card storage section 10 in which a plurality of cards 2 unused are stacked and stored, and a card collecting storage 11 for collecting the card 2 unwanted. As shown in FIG. 1, the card storage section 10 and the card collecting storage 11 are so placed as to be stacked in a vertical direction. Furthermore, the card issuing/collecting unit 6 is equipped with a card dispensing mechanism (not illustrated in the drawing) at a position between the card storage section 10 and the card collecting storage 11 for dispensing a card 2, which is placed at the lowest position among the plurality of cards 2 stored in the card storage section 10, to the card processing unit 5.

The card storage section 10 is formed to be a rectangular parallelepipied box with its top part openable. The card dispensing mechanism includes a discharging claw for discharging each of the cards 2 from the card storage section 10 by hooking the card 2 stored in the card storage section 10, a chain to which the discharging claw is fixed, a driving mechanism for the chain, and so on. The card collecting storage 11 is formed to be a rectangular parallelepipied box with its top part openable. Placed at an entrance of the card collecting storage 11 is a guide for leading the card 2 unwanted to the card collecting storage 11.

In the present embodiment, at the time of issuing the card 2, at first the card dispensing mechanism discharges the card 2 stored in the card storage section 10 to the card processing unit 5. Having received the card 2 discharged from the card storage section 10, the card processing unit 5 records certain information into the card 2 through communication between the antenna embedded in the card 2 and the communication antenna 8. The card 2, into which information has already been recorded, is unloaded from the card loading/unloading unit 4.

On the other hand, for example, when a card 2 inserted through the card loading/unloading unit 4 is judged to require being collected as a result of reproducing information by the card processing unit 5, the card 2 is unloaded from the card processing unit 5 toward the card issuing/collecting unit 6. Then, the card 2 unloaded from the card processing unit 5 is guided to the card collecting storage 11 by the guide and collected there.

Figure 2:
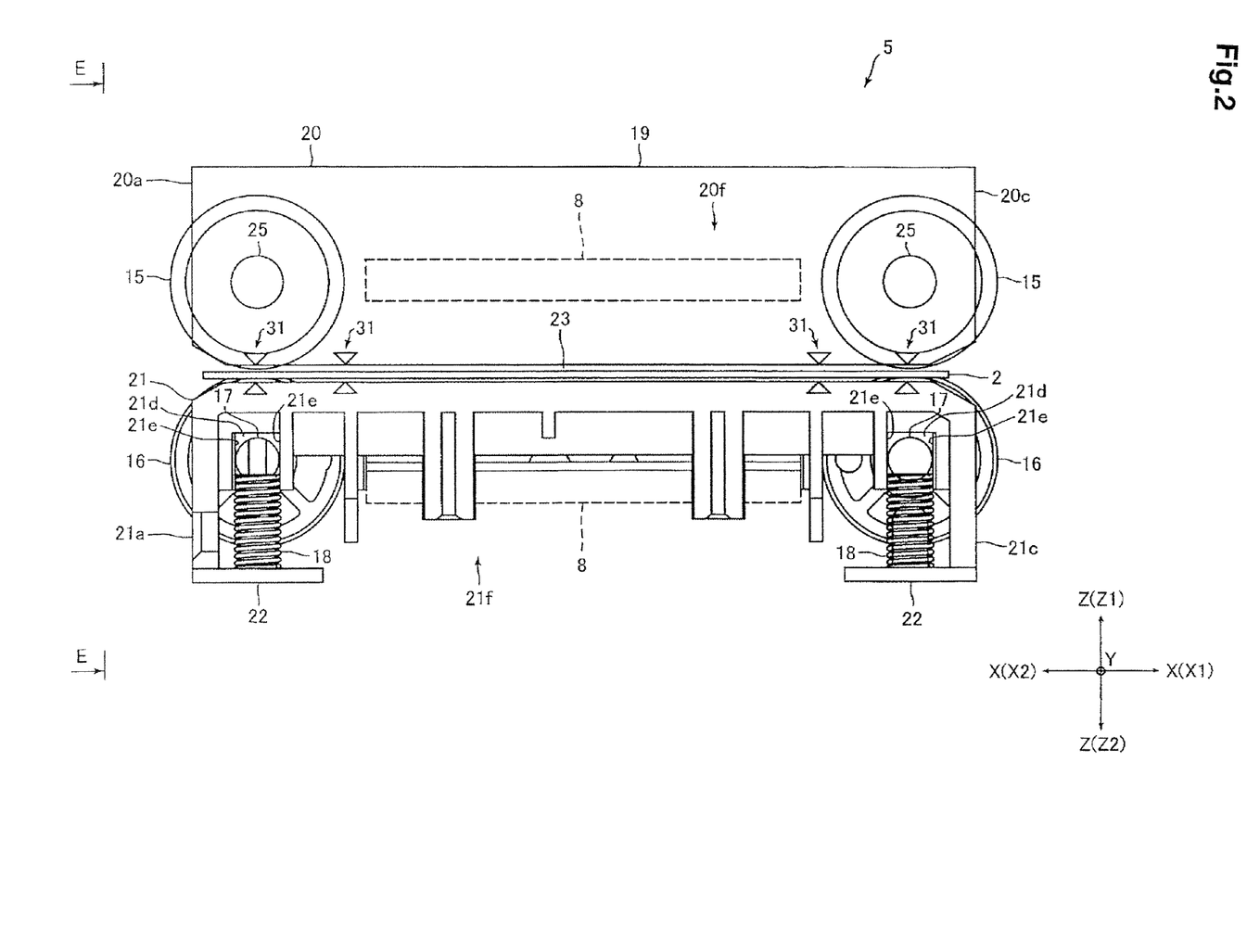
FIG. 2 is a side view drawing for explaining a general structure of a card processing unit shown in FIG. 1.
Figure 3:
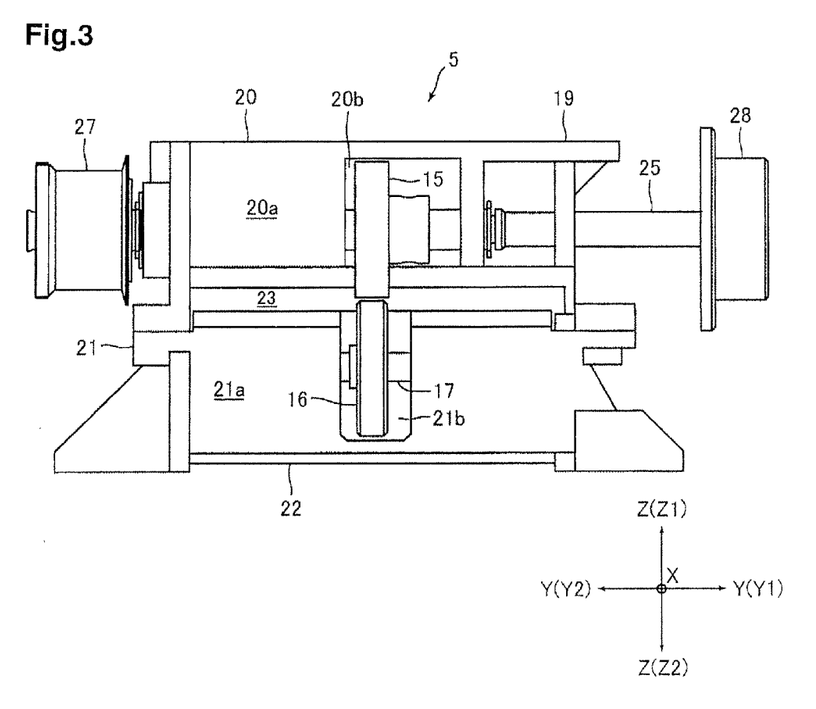
FIG. 3 is a view of the card processing unit from an E-E direction indicated in FIG. 2.
Figure 4:
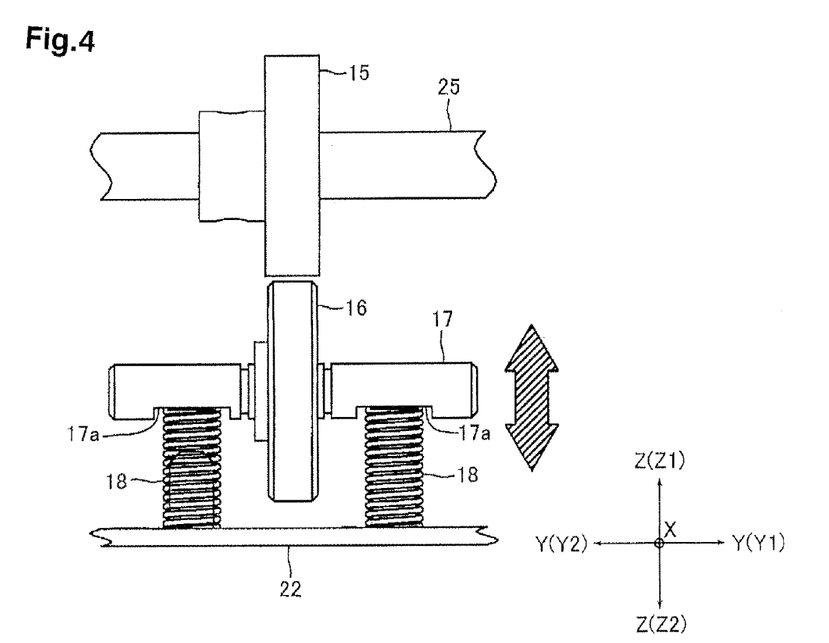
FIG. 4 shows a peripheral mechanism surrounding a transfer roller and a pad roller in a view from the E-E direction indicated in FIG. 2.
Figure 5:
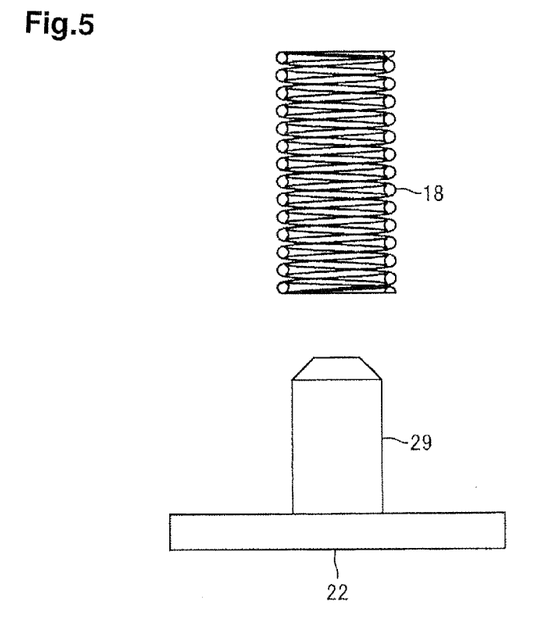
FIG. 5 is a drawing for explaining a supporting mechanism for a compression coil spring shown in FIG. 2.

Structure of Card Processing Unit:

FIG. 2 is a side view drawing for explaining a general structure of the card processing unit 5 shown in FIG. 1. FIG. 3 is a view of the card processing unit 5 from the E-E direction indicated in FIG. 2. FIG. 4 shows a peripheral mechanism surrounding a transfer roller 15 and a pad roller 16 in a view from the E-E direction indicated in FIG. 2. FIG. 5 is a drawing for explaining a supporting mechanism for a compression coil spring 18 shown in FIG. 2.

The card processing unit 5 includes two transfer rollers 15 for transferring the card 2 through contacting a surface of the card 2, pad rollers 16 so placed as to face and bias themselves to the transfer rollers 15, fixed shafts 17 for supporting the pad rollers 16 so as to be rotatable, compression coil springs 18 as coil springs for biasing the fixed shafts 17, and a frame 19 constituting a main body of the card processing unit 5, in addition to the communication antenna 8 described above. The card processing unit 5 further includes a first guide block 20 and a second guide block 21 constituting the main body of the card processing unit 5, as well as spring support plates 22 for supporting the compression coil springs 18. Moreover, the card processing unit 5 according to the present embodiment includes a control board (not illustrated in the drawing) on which a control circuit is mounted for exchanging signals with the communication antenna 8.

In the present embodiment, the card 2 is transferred in an X-direction shown in FIG. 2 and FIG. 3. In other words, the X-direction is a direction in which the card 2 is transferred. In the meantime, a Y-direction and a Z-direction are a widthwise direction (a shorter length direction) and a thickness-wise direction of the card 2, respectively. Namely, the Y-direction is also a shaft direction of the transfer rollers 15 and the pad rollers 16. In the following explanation; an X1 direction side, an X2 direction side, a Y1 direction side, a Y2 direction side, a Z1 direction side, a Z2 direction side in FIG. 2 and FIG. 3 are referred to as a right side, a left side, a front side, a rear side, an upper side, and a lower side, respectively.

The frame 19 includes the first guide block 20, the second guide block 21, and the spring support plates 22 for supporting the compression coil springs 18. Formed in the frame 19 is a transfer path 23 for transferring the card 2.

The first guide block 20 and the second guide block 21 are assembled in a vertical direction (i.e., a direction of thickness of the card 2) and fixed with each other. In the present embodiment, the first guide block 20 is placed at an upper position, and in the meantime the second guide block 21 is placed at a lower position. Then, the transfer path 23 for transferring the card 2 is formed between the first guide block 20 and the second guide block 21. The transfer path 23, stretching from a right end to a left end of the card processing unit 5, is formed linearly in a right-and-left direction.

As shown in FIG. 3, each of the transfer rollers 15 is fixed to a turning shaft 25. The turning shaft 25 is so supported by the first guide block 20 as to be rotatable, and the transfer roller 15 is placed at an upper side position over the transfer path 23. Then, a bottom part of the transfer roller 15 protrudes into the transfer path 23, as shown in FIG. 3. Fixed at one end of the turning shaft 25 is a pulley 27 for transmitting drive power from a motor 26 (Refer to FIG. 1), placed under the card processing unit 5, to the transfer roller 15.

Fixed at one end of the turning shaft 25 is the pulley 27 for transmitting drive power from the motor 26 (Refer to FIG. 1), placed under the card processing unit 5, to the transfer roller 15. Between a pulley (not illustrated in the drawing) fixed to an output shaft of the motor 26 and each of two pulleys 27, a belt (not illustrated in the drawing) is assembled. In the present embodiment, the pulleys 27 work as a drive power input mechanism into which input is the drive power to be transmitted to the two transfer rollers 15 from the motor 26, as an external driving source.

A knob 28 is fixed at the other end of one of two turning shafts 25 (the turning shaft 25 positioned at the left side, in the present embodiment). Then, even if the card 2 is hooked (jammed) in the card processing unit 5, a user can turn the transfer roller 15 by turning the knob 28 manually to unload the card 2 out of the card processing unit 5.

The two transfer rollers 15 are so placed as to have a certain space between them in the right-and-left direction. In the present embodiment, the two transfer rollers 15 are so placed as shown in FIG. 2 that a distance between centers of the two transfer rollers 15 is shorter than the length of the card 2 in the X-direction (transfer direction). Concretely to describe, the two transfer rollers 15 are so placed as to have a distance between the centers of the two transfer rollers 15, the distance being somewhat shorter than the length of the card 2. Each of the two transfer rollers 15 is placed at each of both ends of the frame 19 in the X-direction (transfer direction).

The pad rollers 16 are placed at a lower side position under the transfer path 23 so as to face the transfer rollers 15 from the lower side. Namely, each of the two pad rollers 16 is placed at each of both the ends of the frame 19 in the X-direction. Also, the two pad rollers 16 are so placed as to have a distance between centers of the two pad rollers 16, the distance being somewhat shorter than the length of the card 2.

The first guide block 20 and the second guide block 21 are made of a nonmagnetic material such as a resin. In the present embodiment, the right-and-left length of the first guide block 20 is almost the same as that of the second guide block 21, as shown in FIG. 2. Then, the right-and-left length of the first guide block 20 and the second guide block 21 is somewhat longer than the right-and-left length of the card 2.

Furthermore, as shown in FIG. 2, a part of a left end side of the transfer roller 15 placed at the left side as well as a part of a left end side of the pad roller 16 placed at the left side protrude out of a left end surface 20a of the first guide block 20 and a left end surface 21a of the second guide block 21. As shown in FIG. 3, a placement opening section 20b for placing the transfer roller 15 is formed at the left end surface 20a of the first guide block 20, meanwhile a placement opening section 21b for placing the pad roller 16 is formed at the left end surface 21a of the second guide block 21. The placement opening sections 20b and 21b are so formed as to lead to the transfer path 23 (to connect with the transfer path 23) in the vertical direction, as shown in FIG. 3.

In the present embodiment, the transfer roller 15 and the pad roller 16 are placed almost at a center position in a Y-direction, as shown in FIG. 3. Therefore, even when an emboss part and/or a magnetic stripe are formed in the card 2, these emboss part and magnetic stripe can avoid contacting the transfer roller 15 and the pad roller 16. Furthermore, since a center part of the card 2 in a width-wise direction is sandwiched between the transfer roller 15 and the pad roller 16, the card 2 can be transferred straight along the transfer direction.

In the same manner, a part of a right end side of the transfer roller 15 placed at the right side as well as a part of a right end side of the pad roller 16 placed at the right side protrude out of a right end surface 20c of the first guide block 20 and a right end surface 21c of the second guide block 21. Then, a placement opening section (not shown in the drawing) for placing the transfer roller 15 is formed at the right end surface 20c of the first guide block 20, meanwhile a placement opening section (not shown in the drawing) for placing the pad roller 16 is formed at the right end surface 21c of the second guide block 21. These placement opening sections, referred to as 20b and 21b, are so formed as to lead to the transfer path 23 (to connect with the transfer path 23) in the vertical direction, as shown in FIG. 3.

A fixed shaft 17 is formed as a slender and almost cylindrical rod. As shown in FIG. 4, the pad roller 16 is so supported almost at a center position of the fixed shaft 17 in an axial direction (in the Y-direction) as to be rotatable. In other words, the fixed shaft 17 protrudes at both sides of the pad roller 16 in the axial direction. At both the sides of the pad roller 16 in the axial direction, formed in the fixed shaft 17 are flat contacting planes 17a that contact with top ends of compression coil springs 18. Furthermore, both ends of the fixed shaft 17 are positioned in a shaft supporting groove 21d (Refer to FIG. 2) formed in the second guide block 21. The shaft supporting groove 21d includes two plane parts 21e that are in parallel with an Y-Z plane formed by the Y-direction and Z-direction; and the shaft supporting groove 21d plays roles of functions for supporting the fixed shaft 17 as well as guiding the fixed shaft 17 in the vertical direction.

Each of both the sides of the pad roller 16 in the axial direction is equipped with each of the compression coil springs 18. As shown in FIG. 5, a spring penetrating shaft 29 fixed to a spring support plate 22 penetrates through the compression coil spring 18. In the meantime, the spring support plate 22 is fixed to a bottom side of the second guide block 21. The top end of the compression coil spring 18 contacts with the flat contacting plane 17a of the fixed shaft 17, meanwhile a bottom end of the compression coil spring 18 contacts with an upper surface of the spring support plate 22.

Consequently, the two compression coil springs 18 bias the fixed shaft 17 upward (in a thickness-wise direction of the card 2). In other words, the compression coil springs 18 bias the pad roller 16 in a direction for pressing the pad roller 16 toward the transfer roller 15, through the intermediary of the fixed shaft 17.

In the present embodiment, each of both the sides of the pad roller 16 in the axial direction is equipped with each of the compression coil springs 18. Therefore, for example, even if the card 2 inserted has a warp (namely, in the case of a warped card) in its width-wise direction (a shorter length direction), the pad roller 16 can still follow the warp of the card 2. Accordingly, a contacting area between the pad roller 16 and the card 2 can be maintained so that the card 2 can be transferred for certain.

Depending on specifications of the card 2, the communication antenna 8 is located either at an antenna placement area 20f formed between the two transfer rollers 15 in the first guide block 20, or at an antenna placement area 21f formed between the two pad rollers 16 in the second guide block 21. Incidentally, the communication antenna 8 may be placed at both the antenna placement areas 20f and 21f.

The card processing unit 5 are equipped with a plurality of sensors 31 for detecting a presence of the card 2. The card processing unit 5 of the present embodiment includes 4 sensors 31. Each of the sensors 31 is, for example, composed of a light receiving element and a light emitting element, placed face-to-face in the vertical direction so as to sandwich the transfer path 23. As shown in FIG. 2, in the right-and-left direction, each of the 4 sensors 31 is positioned at two locations of the transfer rollers 15 and the pad rollers 16, at a right side of the transfer roller 15 and the pad roller 16 positioned at the left-hand side, and at a left side of the transfer roller 15 and the pad roller 16 positioned at the right-hand side.

The card processing unit 5 are equipped with a plurality of sensors 31, as a card detecting system, for detecting a presence of the card 2. The card processing unit 5 of the present embodiment includes 4 sensors 31. Each of the sensors 31 is, for example, composed of a light receiving element and a light emitting element, placed face-to-face in the vertical direction so as to sandwich the transfer path 23. As shown in FIG. 2, in the right-and-left direction, each of the 4 sensors 31 is positioned at two locations of the transfer rollers 15 and the pad rollers 16, at a right side of the transfer roller 15 and the pad roller 16 positioned at the left-hand side, and at a left side of the transfer roller 15 and the pad roller 16 positioned at the right-hand side. Namely, the four sensors 31 are laid out at intervals being shorter than the length of the card 2 in the transfer direction.

In the card processing unit 5 constructed as described above, the communication takes place between the antenna embedded in the card 2 and the communication antenna 8 under conditions where both ends of the card 2 in the X-direction are held by the transfer rollers 15 and the pad rollers 16. For example, the card 2 stops its movement under conditions where both the ends of the card 2 in the X-direction are held by the transfer rollers 15 and the pad rollers 16, and then the communication takes place between the antenna embedded in the card 2 and the communication antenna 8. Incidentally, if the communication between the antenna embedded in the card 2 and the communication antenna 8 is in poor condition, the card 2 may be shifted by the transfer rollers 15 to a position where the condition of the communication is improved. In other words, the position of the card 2 at the time of communication may be adjusted for improving the condition of the communication. In this case, during the communication, the card 2 is held at one side in the X-direction by the transfer roller 15 and the pad roller 16 but may be not held at the other side by the transfer roller 15 and the pad roller 16.

Primary Advantageous Effect of the Present Embodiment

In the present embodiment as described above, the fixed shaft 17 supporting the pad roller 16 is biased upward (in the thickness-wise direction of the card 2) by the compression coil springs 18. Namely, no member for supporting and/or biasing the pad roller 16 exists between the two the pad rollers 16. Therefore, a wide space can be secured between the two the pad rollers 16 so that this arrangement enables increasing the degree of freedom of a location of the antenna placement area 21$f$ to be formed between the two pad rollers 16 for the communication antenna 8. In other words, this arrangement enables increasing the degree of freedom of a location of the communication antenna 8 between the two pad rollers 16. Furthermore, in the present embodiment, the pad roller 16 is supported and biased by a simple mechanism including the fixed shaft 17 and the compression coil springs 18, and accordingly the structure of the card processing unit 5 can be simplified.

In the present embodiment, the flat contacting plane 17$a$ with which the top end of the compression coil spring 18 contacts is formed in the fixed shaft 17. Therefore, the top end of the compression coil spring 18 can contact with the fixed shaft 17 for sure so that the pad roller 16 can appropriately be biased toward the transfer roller 15.

In the present embodiment, the two transfer rollers 15 are so supported as to be rotatable in the first guide block 20 by way of the turning shafts 25, and are so placed as to have a distance between their centers that is shorter than the length of the card 2. On the other hand, the fixed shafts 17 are supported by the second guide block 21. Therefore, the card processing unit 5 can be handled as one module provided with a function for transferring the card 2. Accordingly, this arrangement enables a use of the card processing unit 5 in combination with various units provided with other functions, and also leads to improvement of general versatility of the card processing unit 5. For example, as described in the present embodiment, simple placement of the card loading/unloading unit 4 and the card issuing/collecting unit 6 before and after the card processing unit 5 in the transfer direction can make up the card issuing device 1 provided with functions of issuing and collecting the card 2.

In the present embodiment, a part of a left end side of the transfer roller 15 placed at the left side as well as a part of a left end side of the pad roller 16 placed at the left side protrude out of a left end surface 20$a$ of the first guide block 20 and a left end surface 21$a$ of the second guide block 21. In the same manner, a part of a right end side of the transfer roller 15 placed at the right side as well as a part of a right end side of the pad roller 16 placed at the right side protrude out of a right end surface 20$c$ of the first guide block 20 and a right end surface 21$c$ of the second guide block 21. In other words, the centers of the transfer roller 15 and the pad roller 16 placed at the left side are located in the vicinity of the left end surfaces 20$a$ and 21$a$, meanwhile the centers of the transfer roller 15 and the pad roller 16 placed at the right side are located in the vicinity of the right end surfaces 20$c$ and 21$c$. Accordingly, the card 2 can be transmitted smoothly to/from the card loading/unloading unit 4 and the card issuing/collecting unit 6.

Furthermore, in the present embodiment, the two transfer rollers 15 are individually placed at both the ends of the frame 19 in the transfer direction. Therefore, the card 2 can be loaded into and unloaded from the card processing unit 5. Moreover, the two transfer rollers 15 in the present embodiment are so placed as to have a distance between their centers that is shorter than the length of the card 2 in the transfer direction. Accordingly, the card can be transferred in the card processing unit 5.

Therefore, in the present embodiment, the card processing unit 5 can be handled as one module provided with a data processing function as well as a transferring function for the card 2. As a result, this arrangement enables a use of the card processing unit 5 in combination with various units for card processing provided with other functions, and also leads to improvement of general versatility of the card processing unit 5. For example, as described in the present embodiment, simple placement of the card loading/unloading unit 4 and the card issuing/collecting unit 6 before and after the card processing unit 5 in the transfer direction can make up the card issuing device 1 provided with functions of issuing and collecting the card 2 as well as data processing for the card 2.

In the present embodiment, the communication antenna 8 is located either at the antenna placement area 20$f$ formed between the two transfer rollers 15, or at the antenna placement area 21$f$ formed between the two pad rollers 16. Therefore, the card processing unit 5 can be downsized in the transfer direction and the thickness-wise direction of the card 2 so as to make an installation space for the card processing unit 5 small. Accordingly, this arrangement enables a use of the card processing unit 5 in combination with further various units for card processing.

In the present embodiment, a part of a left end side of the transfer roller 15 placed at the left side as well as a part of a left end side of the pad roller 16 placed at the left side protrude out of a left end surface 20$a$ of the first guide block 20 and a left end surface 21$a$ of the second guide block 21. In the same manner, a part of a right end side of the transfer roller 15 placed at the right side as well as a part of a right end side of the pad roller 16 placed at the right side protrude out of a right end surface 20$c$ of the first guide block 20 and a right end surface 21$c$ of the second guide block 21. In the meantime, the placement opening sections 20$b$ and 21$b$ are so formed as to lead to the transfer path 23 in the vertical direction. In other words, the centers of the transfer roller 15 and the pad roller 16 placed at the left side are located in the vicinity of the left end surfaces 20$a$ and 21$a$, meanwhile the centers of the transfer roller 15 and the pad roller 16 placed at the right side are located in the vicinity of the right end surfaces 20$c$ and 21$c$. Accordingly, the card 2 can be transmitted smoothly to/from the card loading/unloading unit 4 and the card issuing/collecting unit 6.

In the present embodiment, the frame 19 includes the first guide block 20 and the second guide block 21 that are assembled together in the vertical direction. The two transfer rollers 15 are so supported as to be rotatable in the first guide block 20 by way of the turning shafts 25, meanwhile the fixed shafts 17 supporting the two pad rollers 16 so as to be rotatable are supported by the second guide block 21. Therefore, assembling together the first guide block 20, in which the transfer rollers 15 are installed, and the second guide block 21, in which the two pad rollers 16 are installed, in the vertical direction makes it possible to construct the card processing unit 5. As a result, the present embodiment enables easy assembling work of the card processing unit 5.

In the present embodiment, the drive power from the motor 26 installed outside the card processing unit 5 is transmitted to the two transfer rollers 15 by way of the pulleys 27. Therefore, the card processing unit 5 does not need to have any drive power source such as a motor for the transfer rollers 15.

Accordingly, this arrangement enables simplifying the structure of the card processing unit 5.

In the present embodiment, the 4 sensors 31 are laid out at intervals being shorter than the length of the card 2 in the transfer direction. Then, the sensors 31 can detect both sides of the card 2 in the transfer direction. Therefore, according to detection results by using the sensors 31, various controls can be carried out for the card processing unit 5, the card loading/unloading unit 4, and the card issuing/collecting unit 6.

In the present embodiment, the fixed shaft 17 supporting the pad roller 16 is biased upward by the compression coil springs 18. Namely, no member for supporting the pad roller 16 as well as no member for biasing the pad roller 16 exist between the two pad rollers 16. Therefore, a wide space can be secured between the two pad rollers 16 so that this arrangement enables increasing the degree of freedom of a location of the antenna placement area 21*f* to be formed between the two pad rollers 16 for the communication antenna 8. In other words, this arrangement enables increasing the degree of freedom of a location of the communication antenna 8 between the two pad rollers 16. Furthermore, in the present embodiment, the pad roller 16 is supported and biased by a simple mechanism including the fixed shaft 17 and the compression coil springs 18, and accordingly the structure of the card processing unit 5 can be simplified.

Other Embodiments

Described above is an example of a preferred embodiment according to the present invention. However, the present invention is not limited to the above embodiment and various variations and modifications may be made without changing the concept of the present invention.

In the embodiment described above, the card loading/unloading unit 4 and the card issuing/collecting unit 6 are located at the right and left sides of the card processing unit 5. Alternatively, located instead of them at the right and left sides of the card processing unit 5 may be, for example, a printer unit for printing a character on a surface of the card 2 and/or any other card processing unit including a magnetic head and/or an IC contact; or a printer unit for printing a character on the surface of the card 2 and/or an image sensor unit for scanning a character printed on the surface of the card 2. Furthermore, at the right and left sides of the card processing unit 5, there may be located a turn-over unit for changing the transfer direction of the card 2, or a transfer unit that only transfers the card 2 simply. Moreover, it is still possible to simply use the card processing unit 5 alone without any other units at the right and left sides of the card processing unit 5.

In the embodiment described above, the transfer rollers 15 are placed at an upper side position over the transfer path 23, meanwhile the pad rollers 16 are placed at a lower side position under the transfer path 23. Alternatively, the transfer rollers 15 may be placed at a lower side position under the transfer path 23, meanwhile the pad rollers 16 may be placed at an upper side position over the transfer path 23.

In the embodiment described above, the fixed shaft 17 is biased in the thickness-wise direction of the card 2 by the compression coil springs 18. Alternatively, the fixed shaft 17 may be biased in the thickness-wise direction of the card 2 by using a tensile coil spring. In other words, the fixed shaft 17 may be pulled upward by the tensile coil spring. Moreover, the fixed shaft 17 may still alternatively be biased in the thickness-wise direction of the card 2 by using a torsion coil spring. Furthermore, it is also possible to bias the fixed shaft 17 in the thickness-wise direction of the card 2 by using an elastic material, such as rubber.

In the embodiment described above, the pad rollers 16 are so supported by the fixed shafts 17 as to be rotatable. Alternatively, for example, each of the pad rollers 16 may be fixed to a turning shaft that protrudes in an axial direction of the pad roller 16 and turns together with the pad roller 16. In this case, for example, simply required is that each of bearing units for supporting the turning shaft at both sides in the axial direction of the pad roller 16 is biased in the thickness-wise direction of the card 2 by a compression coil spring 18.

Figure 6:
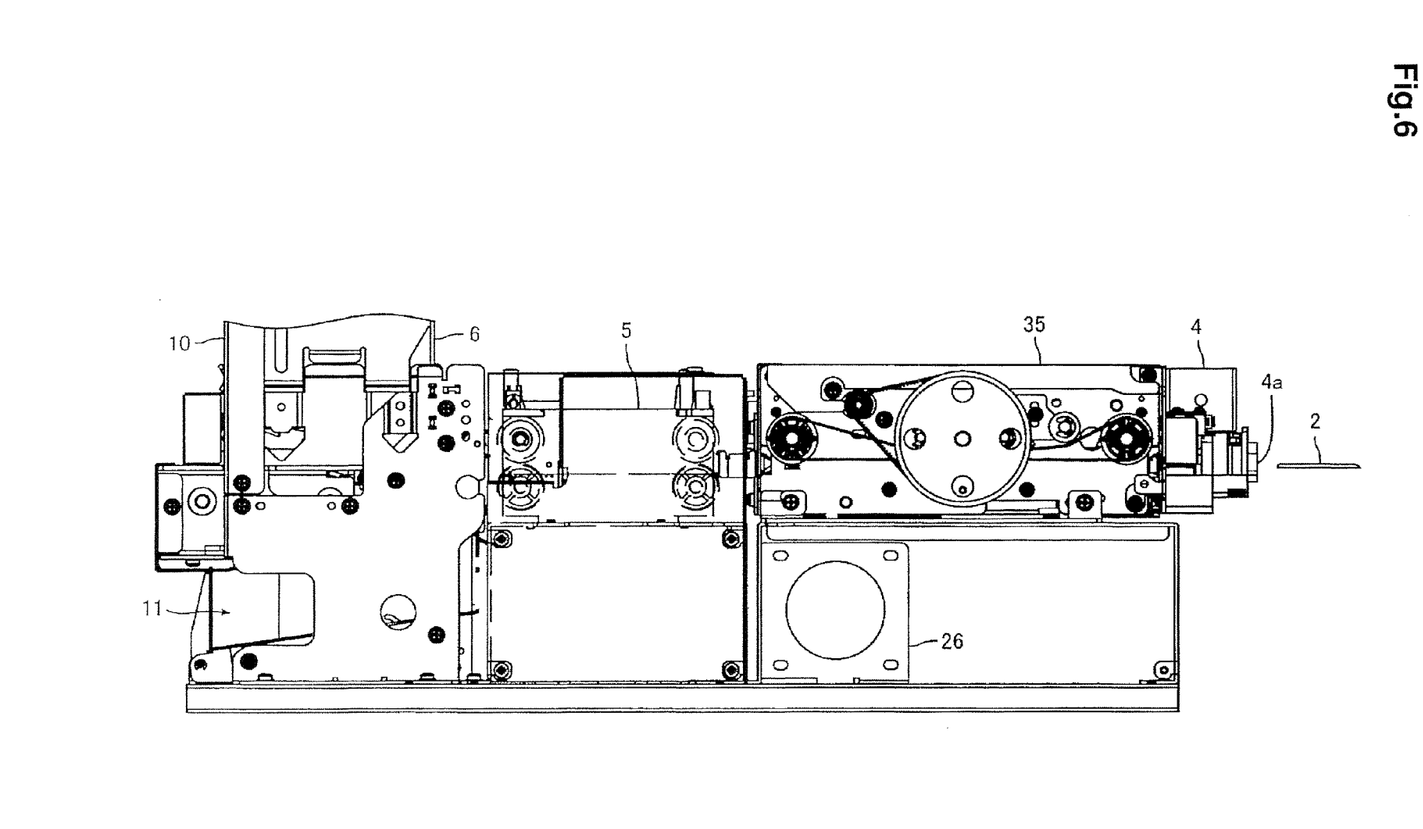
FIG. 6 is a side view drawing for explaining a general structure of a card issuing device according to another embodiment of the present invention.

In the embodiment described above, the card loading/unloading unit 4 is located at a right side of the card processing unit 5. Alternatively, for example, another card processing unit 35 including a magnetic head and/or an IC contact may be located at a right side of the card processing unit 5, as shown in FIG. 6. In this case, for example, the card loading/unloading unit 4 is located next to a right end of the card processing unit 35, as shown in FIG. 6.

In the embodiment described above, the communication antenna 8 is located either at the antenna placement area 20*f* or at the antenna placement area 21*f*. Alternatively, for example, the communication antenna 8 may be located at both the antenna placement areas 20*f* and 21*f*. Furthermore, a magnetic head and/or an IC contact may be located at the antenna placement area 20*f* or 21*f*. In this case, the card processing unit 5 can be provided with a function of recording/reproducing magnetic data, and the like.

In the embodiment described above, the pulley 27 is fixed at one end of the turning shaft 25. The pulley 27 works as a drive power input mechanism into which drive power, to be transmitted from the motor 26 to each of the two transfer rollers 15, is input. Alternatively, for example, a gear may be fixed at one end of the turning shaft 25, while the gear working as a drive power input mechanism into which drive power from the motor 26 is input.

In the embodiment described above, the frame 19 can be split in a vertical direction into two sections; namely being composed of the first guide block 20 and the second guide block 21. Alternatively, for example, the frame 19 may be constructed as one integral structure that cannot be split in the vertical direction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1. Card issuing device
2. Card (Non-contact IC card)
5. Card processing unit
8. Communication antenna
10. Card storage section
15. Transfer roller
16. Pad roller
17. Fixed shaft
17*a*. Flat contacting plane
18. Compression coil spring (Coil spring)
19. Frame
20. First guide block
20*a*. Left end surface (End surface)
20*b*. Opening for placement
20*c*. Right end surface (End surface)
21. Second guide block 21a. Left end surface (End surface)
21b. Opening for placement
21c. Right end surface (End surface)
23. Transfer path
X. Transfer direction
Y. Shaft direction
Z. Thickness-wise direction

What is claimed is:

1. A card processing unit comprising:
a communication antenna configured to communicate with a non-contact IC card;
two transfer rollers configured to transfer the non-contact IC card while contacting a surface of the non-contact IC card;
pad rollers placed so as to face and bias themselves to the transfer rollers;
two fixed shafts, each protruding in an axial direction from both sides of each pad roller, each fixed shaft supporting the corresponding pad roller so as to be rotatable;
two compression coil springs provided for each fixed shaft, each pair of compression coil springs being configured to bias the corresponding fixed shaft in a direction so as to press the corresponding pad roller toward the corresponding transfer roller at the both sides in the axial direction of the corresponding pad roller; and
a spring penetrating shaft provided for each compression coil spring, each spring penetrating shaft being fixed to a spring support plate for supporting each compression coil spring;
wherein a top end of each compression coil spring contacts the corresponding fixed shaft and a bottom end of each compression coil spring contacts an upper surface of the corresponding spring support plate in a state that each compression coil spring is supported by the corresponding spring penetrating shaft, and thereby each pair of compression coil springs bias the corresponding fixed shaft upward to bias the corresponding pad roller in a direction for pressing the corresponding pad roller toward the corresponding transfer roller.

2. The card processing unit according to claim 1;
wherein formed in each of the fixed shafts are flat contacting planes with which ends of the compression coil springs contact.

3. The card processing unit according to claim 1;
wherein the card processing unit includes a first guide block and a second guide block that are assembled in a direction of thickness of the non-contact IC card so as to form a transfer path for transferring the non-contact IC card;
wherein the two transfer rollers are so supported as to be rotatable by one of the first guide block and the second guide block, while being so placed as to have a distance between their centers that is shorter than the length of the non-contact IC card in a transfer direction of the non-contact IC card; and
wherein the fixed shafts are supported by the other of the first guide block and the second guide block.

4. The card processing unit according to claim 3;
wherein a part of each of the transfer rollers protrudes in the transfer direction out of end surfaces of the first guide block and the second guide block in the transfer direction.

5. The card processing unit according to claim 1;
wherein the transfer rollers are placed at an upper side position over the transfer path while the pad rollers are placed at a lower side position under the transfer path.

6. A card issuing device comprising:
the card processing unit according to claim 1;
a card storage section for storing the non-contact IC card; and
a card dispensing mechanism for dispensing the non-contact IC card, stored in the card storage section, to the card processing unit.

7. A card processing unit comprising:
a communication antenna configured to communicate with a non-contact IC card;
two transfer rollers configured to transfer the non-contact IC card while contacting a surface of the non-contact IC card;
pad rollers placed so as to face and bias themselves to the transfer rollers;
two turning shafts, each protruding in an axial direction from both sides of each pad roller, each turning shaft being configured to turn together with the corresponding pad roller;
two compression coil springs provided for each turning shaft, each pair of compression coil springs being configured to bias the corresponding turning shaft in a direction so as to press the corresponding pad roller toward the corresponding transfer roller at the both sides in the axial direction of the corresponding pad roller; and
a spring penetrating shaft provided for each compression coil spring, each spring penetrating shaft being fixed to a spring support plate for supporting each compression coil spring;
wherein a top end of each compression coil spring contacts the corresponding turning shaft and a bottom end of each compression coil spring contacts an upper surface of the corresponding spring support plate in a state that each compression coil spring is supported by the corresponding spring penetrating shaft, and thereby each pair of compression coil springs bias the corresponding turning shaft upward to bias the corresponding pad roller in a direction for pressing the corresponding pad roller toward the corresponding transfer roller.

8. A card issuing device comprising:
the card processing unit according to claim 7;
a card storage section for storing the non-contact IC card; and
a card dispensing mechanism for dispensing the non-contact IC card, stored in the card storage section, to the card processing unit.

9. A card processing unit comprising:
a communication antenna configured to communicate with a non-contact IC card;
two transfer rollers configured to transfer the non-contact IC card in a transfer direction while contacting a surface of the non-contact IC card;
a frame having a transfer path through which the non-contact IC card is transferred;
pad rollers placed so as to face and bias themselves to the transfer rollers;
two fixed shafts, each protruding in an axial direction from both sides of each pad roller, each fixed shaft supporting the corresponding pad roller so as to be rotatable;
two compression coil springs provided for each fixed shaft, each pair of compression coil springs being configured to bias the corresponding fixed shaft in a direction so as to press the corresponding pad roller toward the corresponding transfer roller at the both sides in the axial direction of the corresponding pad roller; and a spring penetrating shaft provided for each compression coil spring, each spring penetrating shaft being fixed to a spring support plate for supporting each compression coil spring;

wherein each of the two transfer rollers is supported so as to be rotatable at both ends of the frame in the transfer direction of the non-contact IC card;

wherein the two transfer rollers configured so as to have a distance between their centers that is shorter than a length of the non-contact IC card in the transfer direction; and wherein a top end of each compression coil spring contacts the corresponding fixed shaft and a bottom end of each compression coil spring contacts an upper surface of the corresponding spring support plate in a state that each compression coil spring is supported by the corresponding spring penetrating shaft, and thereby each pair of compression coil springs bias the corresponding fixed shaft upward to bias the corresponding pad roller in a direction for pressing the corresponding pad roller toward the corresponding transfer roller.

10. The card processing unit according to claim 9;

wherein the card processing unit includes two pad rollers placed so as to face and bias themselves to the transfer rollers;

wherein each of the two pad rollers is so supported as to be rotatable at both ends of the frame in the transfer direction; and wherein the communication antenna is placed at least one of an area between the two transfer rollers and another area between the two pad rollers.

11. The card processing unit according to claim 9;

wherein a part of each of the transfer rollers protrudes in the transfer direction out of end surfaces of the frame in the transfer direction.

12. The card processing unit according to claim 11;

wherein formed at end surfaces of the frame in the transfer direction are placement opening sections in each of which a part of the transfer rollers is placed; and wherein each of the placement opening sections leads to the transfer path in the thickness-wise direction of the non-contact IC card.

13. The card processing unit according to claim 9;

wherein the card processing unit includes two pad rollers placed so as to face and bias themselves to the transfer rollers;

wherein the frame includes a first guide block and a second guide block that are assembled together in the thickness-wise direction of the non-contact IC card so as to form the transfer path; and wherein the transfer rollers are so supported as to be rotatable by one of the first guide block and the second guide block, while the pad rollers are so supported as to be rotatable by the other of the first guide block and the second guide block.

14. The card processing unit according to claim 9;

wherein the card processing unit includes a drive power input mechanism into which input is drive power to be transmitted to the two transfer rollers from an external driving source.

15. The card processing unit according to claim 9;

wherein the card processing unit includes at least two card detection mechanisms located at intervals shorter than the length of the non-contact IC card in the transfer direction.

16. The card processing unit according to claim 9;

wherein the card processing unit includes:
 pad rollers placed so as to face and bias themselves to the transfer rollers;
 fixed shafts protruding at both sides in an axial direction of the pad rollers for supporting the pad rollers so as to be rotatable; and
 coil springs for biasing the fixed shafts in a direction for pressing the pad rollers toward the transfer rollers at both the sides in the axial direction of the pad rollers.

\* \* \* \* \*